United States Patent [19]

Huffman

[11] 4,186,529
[45] Feb. 5, 1980

[54] PROGRAMMABLY CONTROLLED METHOD FOR GRINDING END CUTTING TOOLS AND THE LIKE

[75] Inventor: Stanley E. Huffman, Clover, S.C.

[73] Assignee: S. E. Huffman Corporation, Clover, S.C.

[21] Appl. No.: 896,987

[22] Filed: Apr. 17, 1978

Related U.S. Application Data

[62] Division of Ser. No. 810,776, Jun. 28, 1977, Pat. No. 4,115,956.

[51] Int. Cl.² .............................................. B24B 1/00
[52] U.S. Cl. .................................. 51/288; 51/165 TP
[58] Field of Search .......... 51/94 CS, 96, 97, 165 TP, 51/165.71, 165.87, 225, 288

[56] References Cited

U.S. PATENT DOCUMENTS

| | | | |
|---|---|---|---|
| 3,634,976 | 1/1972 | Hahn | 51/165.71 |
| 3,680,262 | 8/1972 | Aydelott | 51/96 |
| 3,680,263 | 8/1972 | Johnson | 51/96 |
| 3,719,459 | 3/1973 | Southland | 51/96 |
| 3,813,823 | 6/1974 | Southland | 51/94 CS |
| 3,816,995 | 6/1974 | Borchert | 51/96 |
| 4,115,956 | 9/1978 | Huffman | 51/96 |

OTHER PUBLICATIONS

HS-1, A Numerically Controlled Universal Grinder, S. E. Huffman Corp., dated prior to Jan. 1976.

*Primary Examiner*—Harold D. Whitehead
*Attorney, Agent, or Firm*—B. B. Olive

[57] ABSTRACT

Disclosed is a numerically controlled method of broad application but particularly useful for grinding cutting edges and clearance surfaces on cutting tools such as end mills and other similar tools. A programmable numerical servo-motor type control is described. All of the grinding operations are completed at a single station in a series of consecutive grinding operations performed by the same grinding wheel and during which the tool remains in the same work holder. The various cutting edges and clearance surfaces to be ground are both mathematically located and mathematically defined such that the grinding operations may be conducted under numerical control according to optimum wheel speed, feed, position and coolant conditions and with a wide range of independently and simultaneously movable axes. A grinding wheel wear compensation program and a coolant dispensing program are also numerically controlled in coordination with the grinding operations.

7 Claims, 15 Drawing Figures

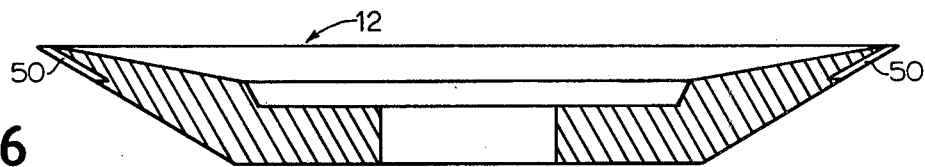
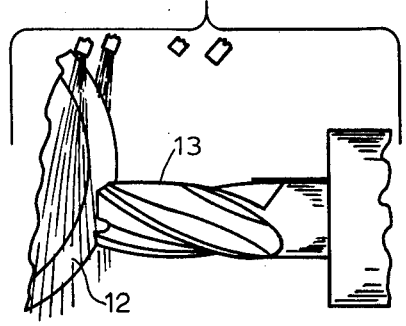
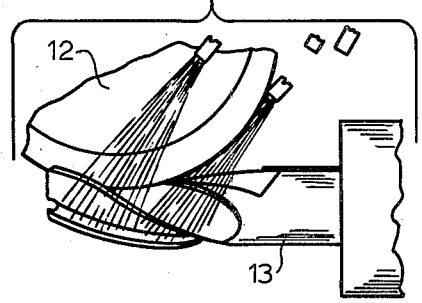
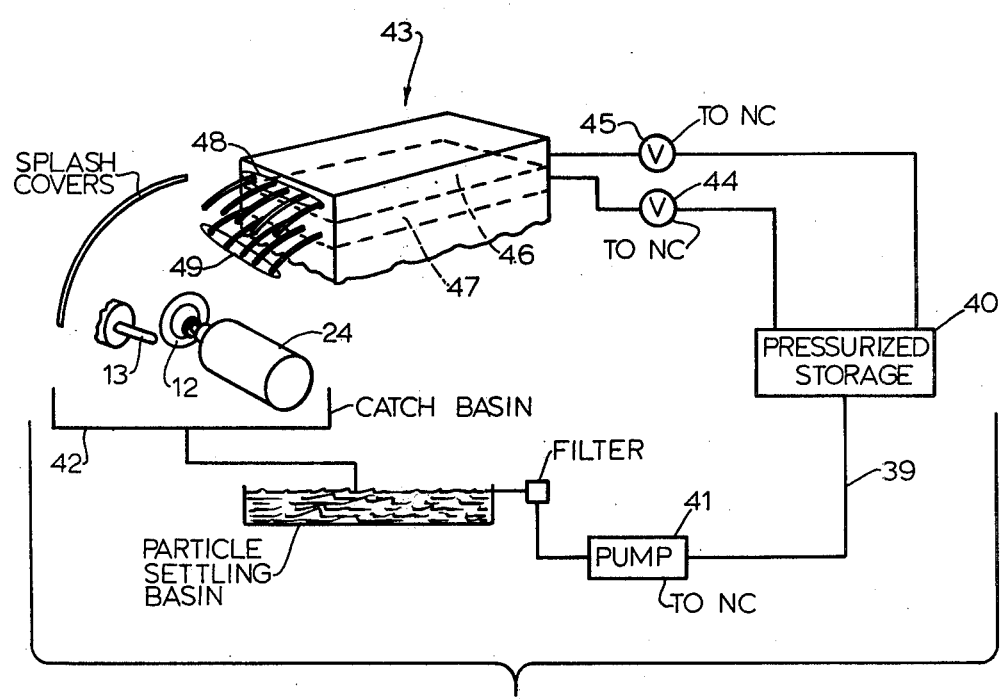

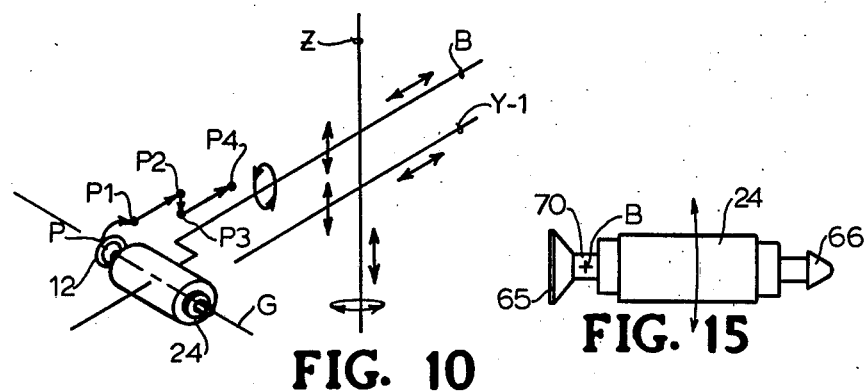
FIG. 10
FIG. 15
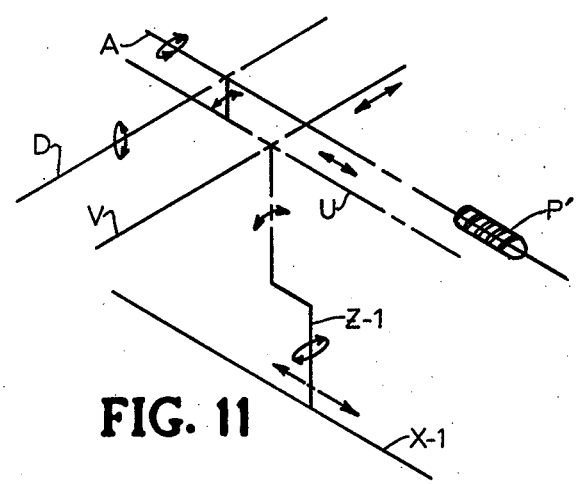
FIG. 11
FIG. 14
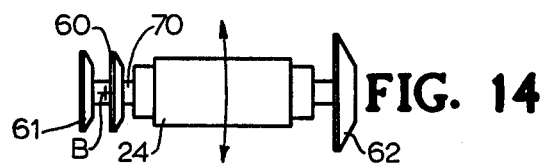
FIG. 12
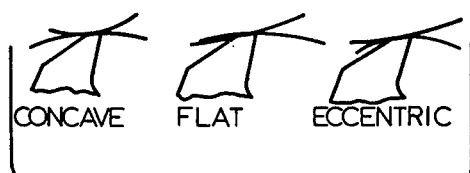
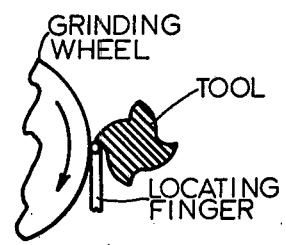
FIG. 13

PROGRAMMABLY CONTROLLED METHOD FOR GRINDING END CUTTING TOOLS AND THE LIKE

CROSS-REFERENCE TO RELATED APPLICATION

This application is a voluntary divisional application of copending application, Ser. No. 810,776, entitled "Programmably Controlled Machine and Method for Grinding End Cutting Tools and the Like", filed June 28, 1977, now U.S. Pat. No. 4,115,956, issued Sept. 26, 1978.

BACKGROUND OF THE INVENTION

1. Field of the Invention

The invention relates to numerically controlled apparatus and methods for grinding and particularly as applicable to cutting tools.

2. Description of the Prior Art

While the invention has a broad application to grinding a wide variety of tools or parts having edges and surfaces whose relative position and shape or form can be defined mathematically, the prior art and the invention will be discussed primarily in connection with grinding of a ball nose end mill as an illustrative case and because of the complexity of such a grinding operation. From such discussion, those skilled in the art will appreciate that many, if not all, of the same basic problems which have affected the grinding of a ball nose end mill have also affected the grinding of other tools of equal or simpler complexity and with respect to which the invention is equally applicable. Also, such explanation will indicate how the invention may be applied to other grinding operations such as encountered in grinding machine parts, e.g., hydraulic valve spools, cams, crush form dressing rolls, and the like, or as encountered in engraving operations.

End mills in general and ball nose end mills being used for illustration, as now manufactured, are known to have uneven flute indexing that is not equally spaced and to have varying helix angles which can be attributed both to the mill of the flutes as well as to distortion caused in heat treating the metal. Grinding of a ball nose end mill has historically represented a formidable and challenging problem for which many solutions have been sought over a long period of years.

According to early prior art methods of grinding cutting tools, in particular ball nose end mills, the gash was manually ground resulting in the gash having an undesirable negative rake and also resulting in nonuniformity from one flute to the next and from one tool to the next. The O.D. relief was ground using a finger that followed the flute whereby any imperfections in the flute were carried over and produced in the O.D. relief. This grinding technique was necessarily a dry operation, i.e. without a lubricant or coolant fluid, since it was based upon a "see and hear" technique. By this is meant that the operator had to see the tool engage the wheel, had to see the finger engage the tool and had to hear the wheel touch the metal. Also, such technique required that the direction of the grinding wheel edge be towards the cutting edge or surface being ground. This caused heat cracks and burs.

An improvement over the time-honored manual grinding technique is described in commonly-owned U.S. Pat. No. 3,680,263. This patent teaches a grinding machine for grinding the gash in a workpiece having helical fluting and forming end cutting teeth on such workpiece. The workpiece and grinding wheel are held on independent, manually adjustable support systems. The grinding wheel support system provides for no coordinated axial movements though the workpiece support system mechanically couples two axial movements. The grinding wheel support system, however, provides for independently manual positioning on two linear axes and one rotative axis. The workpiece support system allows independent, manual positioning on two linear axes in addition to rotative positioning of the workpiece itself about its longitudinal axis. Thus while this patented grinding machine has made provision for relative positioning of the tool and grinding wheel with reference to a relatively large number of reference axes, the complete geometry has not been obtained primarily because all of the necessary axis motions for the workpiece and grinding wheel positions were not able to be positioned simultaneously and were necessarily made manually and by visual observation. It has been found that while this was an improvement in the state of the art, the lack of uniformity from one tool to the next was still a factor and cutters were not ground to their optimum possibilities nor was it possible to grind the tools complete with the apparatus described in the patent. Also, there has been the continuing practice of the "see and hear" technique, previously explained.

Other improvements directed to automated grinding of cutting tools are illustrated in U.S. Pat. Nos. 3,680,262; 3,719,459; 3,813,823, and 3,816,995. These patents generally teach systems for grinding end mills by machine controlled operations; thus, in some instances, reducing the amount of skill required to duplicate work from one tool to the next. U.S. Pat. Nos. 3,680,262 and 3,813,823, for example, teach a system having three separate stations at which different operations are performed on the tool under automatic control and with use of a coolant. A first station is the radius-/O.D. grinder. The second station is the gasher. The third station is the reliever. Simultaneous movement of two reference axes is achieved with a cam-follower arrangement. A primary drawback of this system, however, is that each end mill must be manually loaded and unloaded into each of the three stations before grinding is completed. The repositioning of the end mill and three different tool holders necessarily results in a nonuniformity among the finished end mills. Furthermore, the three separate grinding machines have to be set up manually for each size cutter and separate grinding wheels, work holders, and the like, must be provided for each machine.

U.S. Pat. No. 3,719,459 also refers to an automatic grinding operation. However, the grinding machine of U.S. Pat. No. 3,719,459 is primarily directed to grinding the end faces only as distinct from grinding all of the required clearance surfaces and cutting edges as with the present invention. U.S. Pat. No. 3,816,995 improves on U.S. Pat. No. 3,719,459 but the apparatus of both patents is severely restricted in the number of controlled reference axes and in the number of operations that can be completed automatically at one station and by inherent limitations of the hydraulic-air logic control. Furthermore, all of the previously-mentioned prior art is handicapped by the inability to move a relatively large number of reference axes simultaneously and independently under machine control. In contrast, the present invention is to a great extent directed to means for providing independent and simultaneous movement of a large number of reference axes under numerical control and according to precise, mathematically defined conditions.

A further and more recent improvement in an automatically controlled tool grinder was achieved in the numerically controlled grinder sold and identified by the trademark legend "HS-1 Universal Grinder" by S. E. Huffman Corporation, South Main St., Clover, S.C., 29710, assignee of the present invention. The HS-1 grinder was introduced in 1975 and relative movement of the grinding wheel and tool with respect to seven reference axes moving relatively, independently and simultaneously was achieved. However, while the HS-1 grinder represented a significant advance in the prior art, it has been found that an even greater number of reference axes must be moved independently, relatively and simultaneously in order to achieve the accuracies required in modern tool grinding operations which the HS-1 could not do. Also, the HS-1 grinder had limited ability to spin or rotate the A axis because of limitations of control. This gave limitations on ability to perform grinding of high helix, tapered cutters, ball nose end mills and grinding of plain diameters. While the HS-1 grinder allowed the workpiece to spin, this could be achieved only for a limited time and at a limited speed. Thus, it becomes desirable to provide an improved grinder as with the present invention, capable of spinning the workpiece without such limitations in time and speed to allow grinding operations such as grinding of bar stock or for grinding high helix cutters.

The HS-1 grinder also represented an advance over the prior art in providing a type of coolant system under numerical control. However, the HS-1 grinder coolant system lacked the ability to vary the quantity of coolant and basically required the same quantity of coolant to flow whenever coolant was being directed towards the tool being ground in a particular grinding operation. The HS-1 grinder has thus demonstrated a need for greater versatility in the manner in which the coolant can be directed and controlled with respect to both timing and direction as well as quantity and in relation to particular phases of the overall grinding operation. Also of interest to the present invention is the fact that the HS-1 grinder provided a system for compensating for wheel wear based on automatic gauging of the wheel diameter and, while considered, a feedback for numerical control wear correction was not achieved. However, this experience has dictated a need for an improved numerically controlled wheel wear compensation system which does not require wheel gauging during the grinding operation but nevertheless provides for automatic numerically controlled wheel wear compensation.

In other respects, the HS-1 grinder, as compared to the present invention, utilized hardwired controls which were limited to the number of axis controllable by one control and to moving three axes simultaneously. The type of controls used with the HS-1 grinder did not provide for storage of programs, memory, use of a CRT tube for program display, editing, or making of tapes, and did not allow for simultaneous movement of five, six, seven, eight, and up to ten axes simultaneously as with the present invention. In the HS-1 grinder control system, it was not possible, for example, for the grinding wheel to be moved up and down with reference to the X, Y, and two rotary axes simultaneously which made the grinding of all cutters, and particularly ball nose end mills, complex as compared to the present invention. Full utilization of the U axis was limited since movement of the U axis simultaneous with the A axis could not be achieved.

Therefore, it becomes an object of the present invention to provide a grinding method for grinding cutters, particularly cutting tools, whereby the entire grinding operation may be performed at one station with one grinding wheel, with the tool being held in the same work holder throughout the entire grinding operation and with all of the grinding steps being achieved under automatic numerical control with a high degree of repeatable precision. A further object of the invention is to provide a grinding method which allows the size and type of the cutting tool being ground to be changed without requiring a new machine setup. A further object is to provide a grinding method that allows resharpening of cutters to exact tolerance, with speed and ease and under massive coolant. Another object of the present invention is to provide a grinding method for grinding a complex workpiece requiring simultaneous movement of multiple axis including 5, 6, 7, 8, e.g., a ball nose end mill, and at the same time allow for automatic wheel wear compensation and automatic wheel size compensation. A further object is to provide a method wherein the grinding wheel can be trued or dressed using the simultaneous motion of two or more rotary axes in conjunction with simultaneous movement of two or more linear axes. Another object is to provide a grinding machine capable of making a complex workpiece complete from softened or hardened bar stock. Further, an object is to achieve such a complex workpiece by use of one grinding wheel or by use of multiple grinding wheels on the same end of the wheel spindle or on both ends of the wheel spindle. The foregoing and other objects will become apparent as the description proceeds.

SUMMARY OF THE INVENTION

The grinder employed with the method of the invention is constructed and is operated in reference to the typically fixed X, Y, Z reference axes. The various relative motions and positions of the engaging points on the grinding wheel and the tool being ground are related to these fixed axes. Also, the various cutting edges and clearance surfaces are mathematically located and defined with reference to a fixed point which in turn maintains a fixed relation to the intersection of the fixed X, Y, Z reference axes. Other reference axes are designated X1, Y1, Z1, G, U, V, A, B, and D. Points on the tool are positioned under numerical control relative to five and, alternatively, relative to six reference axes. Points on the grinding wheel are positioned under numerical control relative to three and, alternatively, relative to four reference axes. Rotation of the tool work holder about reference axis D in one embodiment is accomplished manually and the position remains fixed, once set. In an alternative embodiment rotation of the tool work holder about reference axis D is accomplished under numerical control. Rotation of the entire grinding wheel support system about reference axis Z1 also partakes of two embodiments. In one embodiment, such rotation is manually adjusted and remains fixed, once set. In an alternative embodiment, such rotation is accomplished under numerical control as part of an overall programmed operation. The grinding wheel motor axis is reference axis G.

According to the present invention, the cutter tool, a ball nose end mill being used for illustration, is ground at one station under automatic numerical control such that the end mill once ground is ground complete and is ready for use in its intended application. A CNC (computer numerical control) type control is employed in conjunction with DC closed loop servo drive systems of the pulse width and frequency modulated type. All of the edges and surfaces to be ground are mathematically located and defined and during the numerically controlled grinding operation are generated in reference to an arbitrary fixed point which remains fixed with reference to the XYZ intersection and throughout the grinding operation.

In addition to providing for program control over the grinding operations, per se, the method of the invention also includes an improved wheel wear compensation program which can be preset for modifying the machine movements when grinding successive tools in order to adjust for the marginal wear on the grinding wheel which is experienced from tool to tool. The method of the invention also provide for automatic wheel size compensation. The grinding wheel is of a construction which uniquely lends itself to such automatic programmed wheel wear compensation. Thus, the need for operator skill is removed from this operation. Additionally, the invention method utilizes a multi-bank coolant supply system having the capability under numerical control of supplying the required lubricant-coolant at selected times, in selected directions, and in selected quantities according to the particular grinding operation being performed and to properly direct maximum coolant when required.

The tool is completely ground in reference to a fixed point as previously stated and the tool itself remains in the same work holder at the same station and is ground completely with the same grinding wheel to completion. This results not only in a more uniformly ground tool but in a tool which once used and in need of regrinding can be reground using the same reference point. Furthermore, all of the ground edges and surfaces are precisely formed concentric to the tool shank, an achievement not heretofore obtained except possibly at the expense of great time and effort.

In one embodiment, the workpiece, i.e. the tool, and the grinding wheel are automatically moved relative to each other and relative to eight reference axes by numerical controlled servomotor means. In another embodiment, ten reference axes are under numerical control. In both embodiments, the tool and grinding wheel may be moved relatively, independently and simultaneously with respect to as many as eight reference axes. What the invention provides with respect to end mill grinding is the capability of grinding the end gash, secondary and/or radial relief on the end teeth, O.D. relief including primary, secondary and/or radial relief and the desired rake-angle—positive, negative, or combination thereof.

The grinding machine includes a workpiece support system that has a quick change adaptor and collet or other means (holding tube) for holding the workpiece. A numerically controlled servomotor arrangement controls rotation of the workpiece and indexing, i.e. the tool, about its own longitudinal axis, reference axis A. The workpiece support system is mounted on a pair of mutually perpendicular horizontal slides whose positioning is referenced to reference axes U and V. These last-mentioned horizontal slides are, in turn, mounted on a rotary table which revolves around reference axis Z1. The rotary table is mounted on another horizontal slide whose positioning is referred to reference axis X1. The rotary table and the three horizontal slides are all numerically controlled and are independently positioned by the previously described servomotor drive mechanism.

The grinding wheel has a numerically controlled drive system such that the wheel may be rotated at selected times and at selected grinding speeds according to the grinding operation being performed in the overall grinding sequence. The grinding wheel and its respective drive system are mounted on grinding wheel support system having the capability of moving the grinding wheel and its associated motor drive by numerical control operated servomotor mechanisms vertically along the Z axis, rotatably on the horizontal B axis and horizontally along the Y1 axis. As previously mentioned, the entire grinding wheel support system can also be manually rotatively positioned about the Z axis or, in an alternative embodiment, may be rotatively positioned about the Z axis under numerical control. In utilizing the machine and method of the invention after the required program has been installed in the CNC control, the typical ball nose end mill will be prepared for grinding and will be ground in the following described manner.

First, the operator takes the blank end mill, or the end mill to be reground, and inserts it in a collet or holder which, in turn, is inserted into a tool setting device of a type previously known to and used by those skilled in the art. In this device, the operator sets the end mill for the correct length projection and also sets the end mill in a proper radial position so that the flutes to be ground are properly located. The cutter holder in the presetting device is accurately keyed—set by a "timing" ring—so that when the holder is removed from the setup device with the tool to be ground, the same key way—or "timing" ring—will accurately position the tool in the machine workpiece holder. Prior to placing the tool in the machine, the operator places the tool in a workpiece holder similar to the one employed on the machine. The tool in which it is now installed is rotated to determine whether the end mill is running concentric. If not within the limits of concentricity set by the standards being followed, then appropriate adjustments can be made to come within those limits. The tool is next removed from the test workpiece holder and is placed in the workpiece holder on the grinding machine of the invention. The key way and end stop on the machine workpiece holder accurately locate the end mill radially and linearly in relation to the previously mentioned ten axes on the grinding machine and in relation to the grinding wheel itself. If not previously calibrated, the machine can be calibrated by using a blank bar of predetermined dimensions in the machine workpiece holder so that all slides and rotary elements can be brought to a known predetermined starting position under numerical control. This calibration procedure will be apparent to those skilled in the art.

Once the end mill has been prepared for grinding and installed in the machine as described above, all of the positionable elements of the machine are brought to predetermined, initial starting positions. In the embodiment of the invention in which rotative adjustment around reference axes D and Z are controlled manually, these adjustments are made manually and, once fixed, remain set. Otherwise, all of the positionable elements which are numerically controlled are brought to predetermined positions by a subprogram identified later in the description as the "load/unload" program.

Referring next to the purely automatic functions which are performed under numerical control, the initial operation is directed to positioning the tool for flute grinding and cutting the coolant system on for flooding a particular quantity of coolant and in a particular direction as later described in more detail. Also, at this time, the grinding wheel motor drive is numerically controlled to come on and to operate at a predetermined optimum speed for the flute grinding operation. The flutes are then ground into the tool and after being so ground provide a precise reference for later grinding operations. The relative positions, motions and rotations of all slides are dictated from mathematical equations. By this is meant the grinding movements are according to mathematical equations converted to numerical control. While the programming of cutter paths and grinding wheel paths has become a known state of the art, reference is made here that in order to develop the present system, considerable effort has been expended to program the use of multiple slides, particularly when using more than four axes. These programs have been written manually and also computer aided programs have been developed. These computer programs or executive programs or post processors, as the industry has called them, enable the present invention to grind simple and complicated shapes with a minimum of programming effort. The method of writing such programs is a known science in the industry, both manually and by computer.

Upon completion of the flute grinding operation, all of the numerical controlled positionable elements of the machine are positioned for the gash and end teeth relief operation. Next, wheel and tool are positioned for grinding the primary and secondary or radial relief. After this last-mentioned operation, all of the numerically controlled positionable elements of the machine retract to their respective start positions, and the coolant and grinding wheel drive as well as all of the other servomotor drives are rendered inoperative, after which, the finished end mill may be removed from the machine and will have been precisely ground for its end use.

Mention should be made here that the described grinding operations are performed at programmed speeds and feeds and the timing, quantity and direction of the coolant is also programmed and these variables will periodically change during the overall grinding operations. Of particular significance to the degree of precision obtained by the invention method and machine is the fact that all of the programmable variables are controlled not by the operator but by supervisory management such that optimum speeds, timing, feeds, coolant quantity and coolant direction can all be optimized and independent, simultaneous, incremental movements maximized.

Also to be mentioned, as later described in more detail, is the fact that wheel wear can be predetermined based on experience and the predicted amount of wear can be placed into the program such that all of the affected positions can be changed sequentially to compensate for wheel wear as one tool is finished and before the grinding of another tool commences. Grinding operations can also be programmed to match such characteristics as wheel diameter, type of wheel, e.g., rough or finish, and the like. For some grinding operations the grinding wheel speed may mount different types of wheels and plural wheels on the same or on opposite ends of the wheel spindle.

DESCRIPTION OF THE DRAWINGS

FIG. 6 is a section view of the grinding wheel.

FIG. 7 illustrates typical coolant flow on the wheel and tool for grinding the gash.

FIG. 8 illustrates typical coolant flow on the wheel and tool for grinding the flutes.

FIG. 9 schematically illustrates the numerically controlled coolant system.

FIG. 10 is a diagram showing the geometric relationship of the design axes for the wheel support system.

FIG. 11 is a diagram similar to FIG. 10 for the workpiece support system.

FIG. 12 illustrates three types of relief obtainable by the machine and method of the invention.

FIG. 13 illustrates the wheel, tool finger relation in a prior art method.

FIG. 14 is a schematic view of an alternate grinding wheel arrangement.

FIG. 15 is a schematic view of another alternate grinding wheel arrangement.

DESCRIPTION OF THE PREFERRED EMBODIMENT

Figure 1:
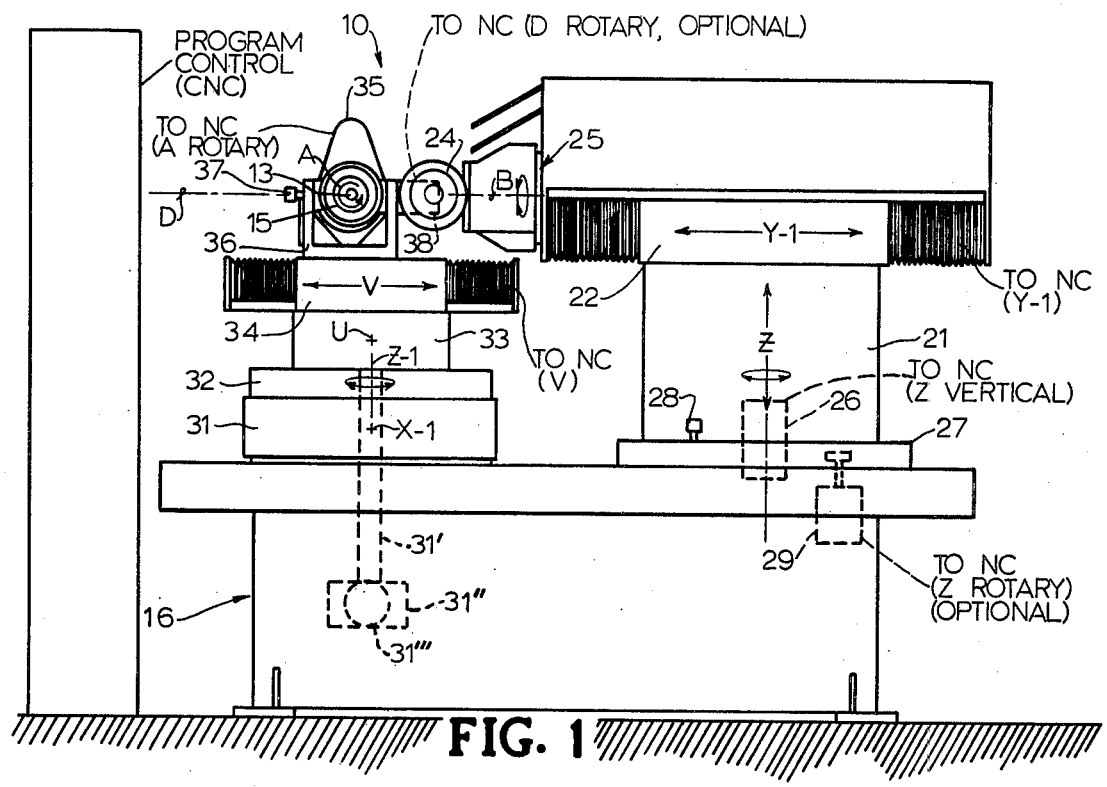
FIG. 1 is a side view of a preferred embodiment of the grinding machine of the invention showing the tool in the workpiece holder and the grinding wheel spaced apart in a nongrinding operation and with various components of the machine, such as the coolant-lubricant supply, connecting electrical lines and the numerical control itself not being shown to facilitate illustration of those components which are most pertinent to the invention, the control being indicated in block diagram.
Figure 2:
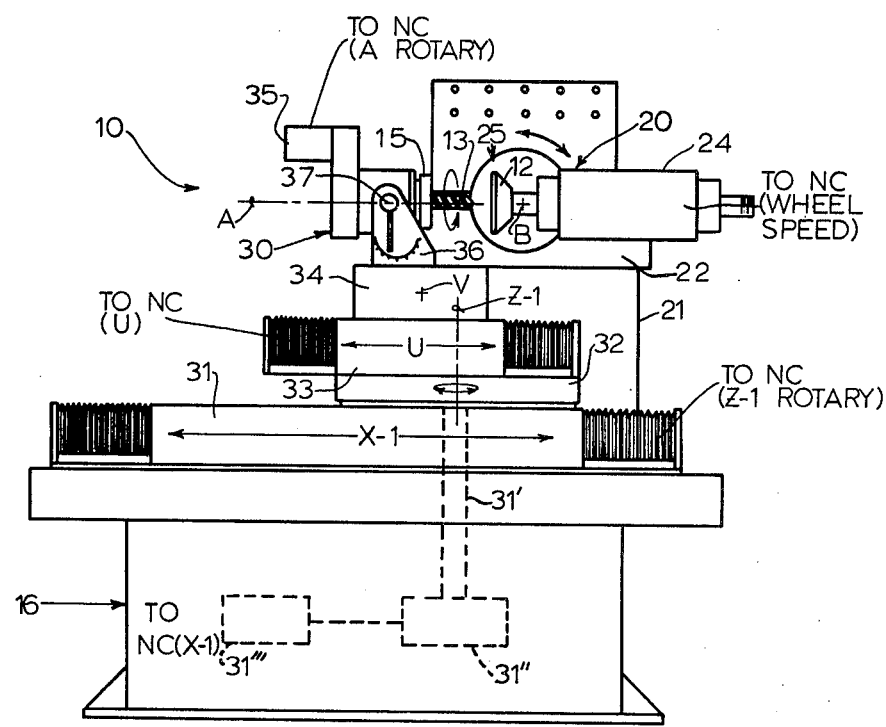
FIG. 2 is an end view of the grinding machine as viewed from the left side of FIG. 1 with coolant lines removed.

Referring to the drawings and particularly FIGS. 1–4, there are shown the basic elements of grinding machine 10 of the present invention. It should be understood that none of FIGS. 1–4 show the numerical control in detail and the legend "To NC" is used to indicate a numerically controlled component utilizing a servomotor mechanism as later described. Also, the coolant system is eliminated in FIGS. 1–4 for purposes of simplification. FIG. 9 diagramatically illustrates the cooling system; however, it should be understood that, while not shown, the machine and method of the invention do incorporate appropriate means to recover, filter, pressurize and reuse the particular coolant-lubricant fluid. Also, various necessary splash covers would be employed as required though not shown except schematically in FIG. 9.

Machine 10 includes a grinding wheel 12 and the workpiece or tool 13 is mounted in the workpiece holder 15. Grinding wheel 12 is, in turn, mounted on a grinding wheel support system 20 and workpiece holder 15 is mounted on a workpiece support system 30. Systems 20 and 30 are, in turn, mounted on the upper surface of a base table 16.

Figure 3:
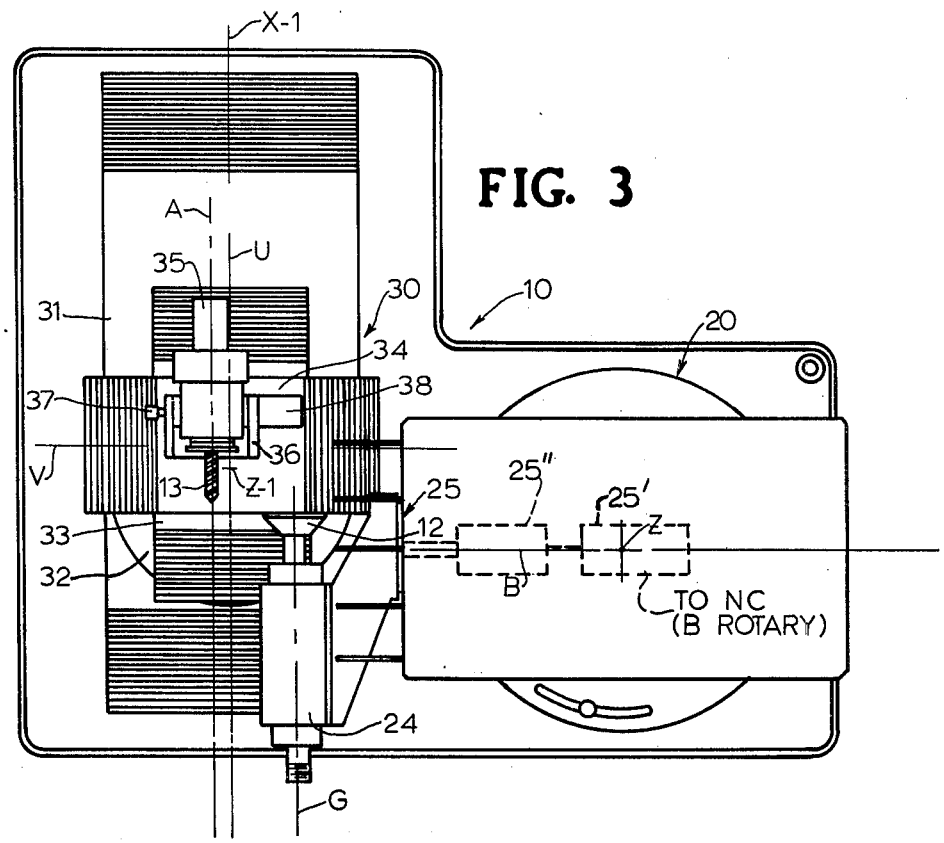
FIG. 3 is a top plan view of the grinding machine illustrated in FIGS. 1 and 2.

The grinding wheel support system 20 comprises a vertically movable support column 21 whose vertical positioning is numerically controlled in reference to fixed reference axis Z as indicated in the drawings. A numerically controlled horizontal slide 22 is mounted atop column 21 and whose horizontal positioning is in reference to offset axis Y1. A grinding wheel drive motor 24 is rotatably positioned under numerical control in reference to axis B passing through slide 22 and rotatably mounted support member 25. Slide 22, drive motor 24 and rotatable mounting member 25 are all mounted on column 21. Thus, all of these elements move vertically up and down as the positioning of column 21 is numerically controlled during the grinding operation by positioner 26. Thus, the vertical location of reference axes B and Y1 may be numerically controlled simultaneous with the numerically controlled linear positioning of slide 22 and independent of the simultaneous rotative positioning under numerical control of grinding wheel drive motor 24 about axis B of mounting member 25. Positioning of member 25 is effected by an associated N/C drive motor 25 and appropriate gear box 25" mounted within slide 22 as indicated in FIG. 3. Wheel 12 itself rotates around reference axis G.

Figure 4:
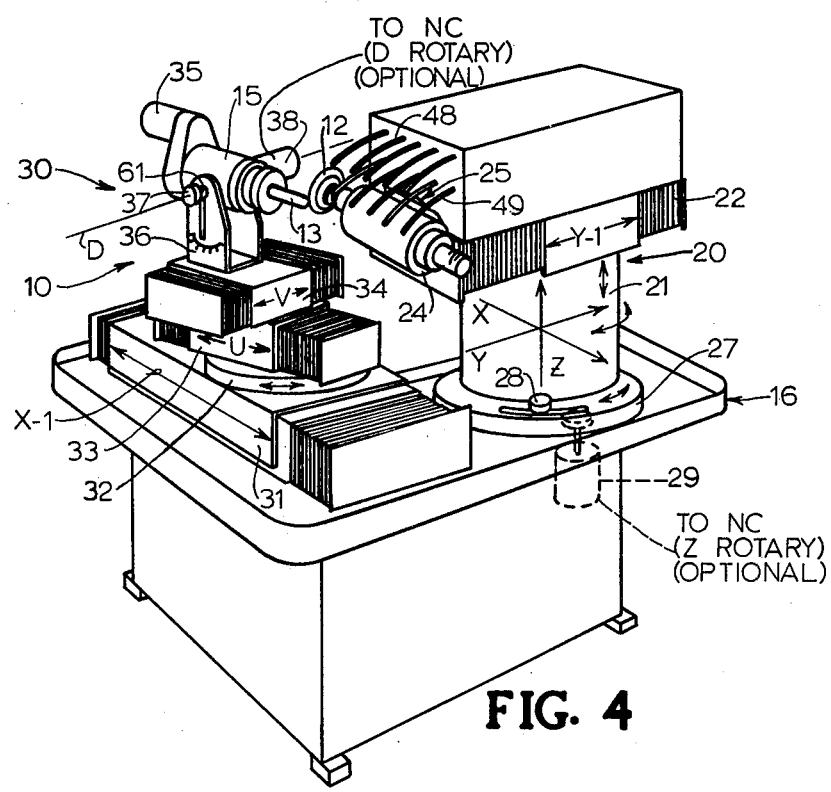
FIG. 4 is a perspective view of the grinding machine with the workpiece support system turned 90 degrees counterclockwise from the position shown in FIGS. 1, 2 and 3.

To further explain the versatility in the relative wheel positioning and relative tool positioning afforded by the present invention, it should be noted that reference axis Y1 represents a horizontal axis parallel to the X-Y axis plane with respect to which slide 22 can be moved in and out to move the engaging point of grinding wheel 12 on the edge or surface of tool 13 being ground. The reference axis B also resides parallel to the X-Y axis plane and the relative positioning of drive motor 24 under numerical control thus provides means for rotating wheel 12 relative to axis B. While reference axis B is illustrated as vertically offset above reference axis Y1, reference axis Y-1 and reference B may be designed to coincide and be considered as both a linear and rotary axis. FIG. 4 also indicates other rotative positioning of column 21 with reference to the X-Y plane. Thus, as schematically indicated in FIG. 10, any arbitrary reference point P on the cutting edge of wheel 12 can rotate under numerical control relative to axis B, as indicated by P1, can move longitudinally under numerical control with reference to axis B, as indicated by P2, can be positioned vertically simultaneously with vertical movement under numerical control of axis B, as indicated by P3, or can be rotated under manual control or, alternatively, under numerical control with reference to axis Z, as indicated by P4.

With respect to the last mentioned rotative positioning of the entire wheel support system about axis Z, it should be noted that the invention provides for alternative manual or numerically controlled positioning of such rotation about axis Z. In general, with experience obtained to date, it has been discovered that due to the wide range of N/C axial positioning afforded by the invention, a wide range of end cutting tools can be ground with the degree of precision contemplated if rotation of the vertical wheel support structure provided by column 21 about axis Z is within a range of plus or minus forty-five degrees from a central position and accommodation is made for fixing such rotated position for each particular tool being ground. However, it is also contemplated that a desire for even higher degrees of precision and even more complex grinds than those found in a ball nose end mill will be sought in the future making use of the present invention. Thus, provision is also made for rotation of the wheel support structure, i.e. column 21, about axis Z under numerical control. Collar 27 thus has a vertical slidable engagement with column 21 and is also adapted to either manual positioning as indicated by manual tightening knob 28 or by an appropriate N/C drive 29 appropriately internally geared to collar 27.

Since the general construction of numerically controlled slides and rotary elements are known to those skilled in the art, the details of the slides, servo mechanisms and the various mechanical elements associated with the described rotary and linear positioning movements are not shown in detail. In a preferred embodiment, the servomotor drive systems of the invention preferably employ DC closed loop servo drive systems and which are further identified as being of the pulse width and frequency modulated type such as sold by Control Systems Research, Inc., 1811 Main St. Pittsburgh, Pa., 15215. Such a servo drive system offers not only precision positioning but also enables the workpiece to spin within a wide speed range and for long time intervals. Thus, bar stock grinding, high helix cutter grinding and like operations can be accommodated as well as the incremental grinding of complex edges and surfaces.

It may also be mentioned here that a preferred type of numerical control is the CNC, i.e. Computerized Numerical Control, type illustrated by the system 7320 Series, sold by the Allen-Bradley Company of Highland Heights, Ohio, 44143. Those skilled in the art will appreciate that the CNC type of control offers unique advantages over hardwired and particularly in regard to providing the possibility of moving as many as eight and possibly 10 reference axes simultaneously under numerical control, since it has been discovered that it is this ability of the present method and invention apparatus to move such a large number of axes simultaneously that leads to the long desired degrees of precision which were not previously obtainable. Other programmable, incremental type controls and incremental drive members equivalent to N/C and servo-drives could be employed.

Having mentioned the type of servomotor drive systems and type of numerical control which are preferred to obtain the degrees of precision sought by the invention, other features of construction are also deemed important to the obtaining of such precision. For example, ball screw drives are used for all of the linear motions. The rotary motions are driven by helical gears and are designed to give virtually no backlash. All of the bearings employed are selected to provide preload adjustment. Thus, the machine and method of the invention, when built and operated as described, enables the obtaining of a tolerance of better than 0.001 inch as compared to the typical prior art tolerance of greater than 0.001. Concentricity and run out within 0.0002 inch can be achieved where prior art could be as much as 0.004 and more.

Having described the general construction and the overall arrangement of the grinding wheel support system 20, the description will next refer to the workpiece, i.e. the tool, support system 30.

In this regard, workpiece support system 30 includes five and alternatively six numerically controlled, servo-driven mechanisms. A N/C horizontal base slide 31 is horizontally positioned in reference to axis X1 which resides parallel to axis X and parallel to the XY plane. Slide 31 is operated by means of an associated drive shaft 31', a gear box 31'' and N/C drive motor 31''' which are suspended on, below and travel with slide 31. A N/C rotary table 32 mounts on slide 31 and rotates relative thereto in a "c" rotation in a horizontal plane and about vertical offset axis Z1. A N/C horizontal slide 33 mounts on and rotates with table 32 and is horizontally positioned in reference to axis U which resides parallel to the XY plane. A N/C horizontal slide 34 mounts on and rotates with horizontal slide 33 and is horizontally positioned in reference to axis V which resides normal to axis U and parallel to the XY plane. Workpiece holder 15 mounts in saddle 36 which, in turn, is secured to horizontal slide 34. Saddle 36 provides a pivotal mount around reference axis D for workpiece holder 15. Reference axis D is normal to the tool axis A. A suitable N/C drive means 35 mounts on workpiece holder 15 and is adapted to rotate the workpiece, i.e. the tool, about its longitudinal axis, reference axis A.

Pivoting of workpiece holder 15 within a range of plus or minus 20 degrees about reference axis D may be accomplished manually with an appropriate manual knob 37 or through an appropriate optional numerically controlled drive means 38. In this regard, it has been discovered that in view of the high degree of precise N/C positioning afforded by the machine and method of the invention that the rotative positioning of workpiece holder 15 around reference axis D can normally be manually fixed within a range of plus or minus twenty degrees from a neutral position by use of manual adjustment knob 37 and held there throughout the grinding. However, as with rotative positioning of the wheel support system around axis Z, as previously explained, it is contemplated as more complex grinds are defined in the future and as an alternative form of positioning to provide a N/C drive motor 38 such that rotative positioning of holder 15 around axis D may also be numerically controlled and be subject to precise, incremental, independent and simultaneous positioning with respect to all other N/C drives and while the grinding sequence is proceeding. Thus, when both N/C rotary drive 29 for positioning around axis Z and N/C rotary drive 38 for positioning around axis D are employed, the machine and method of the invention provides the possibility of ten N/C axes and with the N/C drive for each of such ten axes being adapted for incremental, independent and simultaneous positioning.

As can be seen from the foregoing description and the accompanying drawings, slide 31 provides horizontal motion in the X1 axis direction under numerical control and supports rotary table 32 and the remainder of the elements of the support system 30 above table 32. Since rotary table 32 is mounted on and directly above slide 31, table 32 can move horizontally with slide 31. Rotary table 32 by rotating relative to slide 31 is also designed to support and impart rotary motion around vertical Z-1 under numerical control to those elements residing above rotary table 32, that is, to slides 33, 34, saddle 36 and workpiece holder 15. Slide 33 should also be noted as being adapted to rotate with rotary table 32 and under separate numerical control being adapted to provide horizontal displacement along the U axis. The independently and separately numerically controlled slide 34 which mounts on slide 33 provides displacement along the horizontal reference axis V which is normal to the reference axis U, as shown.

With the immediate foregoing description in mind and referring to FIG. 11, it will be noted that any arbitrary point P' can be rotatively positioned around axis A by the numerically controlled drive means 35, can be caused to move along axis A by the numerically controlled slide 33, can be caused to move along an axis perpendicular to axis A by operation of numerically controlled slide 34, can be caused to rotate around axis Z-1 by numerically controlled rotary table 32 or can be caused to rotate around reference axis D by operation of the manual adjustment knob 36 or optionally, by operation of the numerical control 38 which under the optional arrangement enables the numerically controlled positioning of point P' with reference to axis D. As previously explained, this last arrangement in conjunction with use of optional N/C drive 29 provides a maximum of ten N/C axes. Particular note should be taken that the numerically controlled servo drive mechanisms which operate slide 31, rotary table 32, slide 33, slide 34, drive means 35 and, optionally, drive means 38 are all adapted to operate completely independently and simultaneously thus enabling the obtaining of an extremely high degree of precision not heretofore obtained in any known numerically controlled end mill grinding apparatus or method. Also to be noted in conjunction with the highly versatile positioning capability of the tool itself is the equally important positioning capability of the grinding wheel and its related support system 20 as previously described. Thus, overall, the machine and method of the invention provides an extremely versatile positioning capability not heretofore achieved in any known prior art machine or method.

One of the advantages of the present invention resides in the fact that all the grinding operations can be completed utilizing a coolant and avoiding the dry grinding method of the prior art which had many disadvantages as previously explained. While it was known prior to the present invention to provide a coolant supply under numerical control in a grinding operation, the numerically controlled coolant supply systems of the prior art, so far as is known, called for the coolant supply when "on" to be limited to a specific quantity of coolant being directed to the grinding area in a specific quantity. Such prior art systems did not provide for controlling the quantity of coolant by a numerically controlled system nor did the prior art systems allow the direction of flow of the coolant to be regulated under numerical control. On the other hand, it is known that certain grinding operations are better performed with less coolant than other grinding operations. It is also known that since the angle of attack of the grinding wheel towards the tool being ground is substantially different in one grinding operation than in another grinding operation and the actual area being ground will vary substantially from one operation to another operation, it is also known that the direction in which the coolant is directed towards the grinding area can be optimized for each grinding operation. With the foregoing in mind, the present invention provides means for numerically controlling both the quantity of coolant and the direction or orientation of the coolant flow according to optimized conditions related to the particular grinding operation being performed. FIGS. 7 and 8 illustrate typical situations.

A somewhat schematic diagram of the coolant system is illustrated in FIG. 9. The coolant is collected, recirculated and reused through appropriate piping 39, collection basin means 42, and the like, of conventional construction and which are not otherwise shown in detail for purposes of simplification. The coolant is transferred through an appropriate pump 41 and is held in a suitable pressurized storage vessel 40 for transfer to a multi-coolant bank 43 through a pair of numerically controlled valves 44, 45. As indicated in FIG. 9, coolant bank 43 comprises respective upper and lower dispensing chambers 46, 47. Chambers 46, 47 are thus designed to independently supply coolant to the grinding area through respective independent sets of coolant discharge lines 48, 49. Thus, the coolant may be supplied through either or both of discharge line sets 48, 49 so as to apply coolant to the grinding operation in the appropriate quantity and in the appropriate orientation or direction as required for optimizing the particular grinding operation. Discharge lines 48, 49 may be made either of a rigid tubing, e.g. copper, and bent so as to assume a fixed direction of discharge and so that lines 48 assume one direction of orientation and lines 49 assume a different orientation or lines 48, 49 may be formed of a type of tubing which can be bent to a particular shape as required such as used with flexible oil funnels, and the like, thus allowing coordination of coolant with grinds as in FIGS. 7-8 and some freedom in changing the direction of discharge with the type of tool being ground. Where the same type of tool is being ground on a repetitive basis, it is, of course, contemplated that lines 48, 49 will have their respective directional orientation fixed for grinding that particular type of tool under optimum conditions. It is also contemplated that where sufficient work is available for repetitive grinding of a single type of tool that the prior art method of providing a fixed quantity of coolant which is always supplied in the same orientation and in the same quantity will be adequate and such prior art method of operating the coolant supply is, of course, compatible with the other features of the invention herein disclosed.

Figure 5:
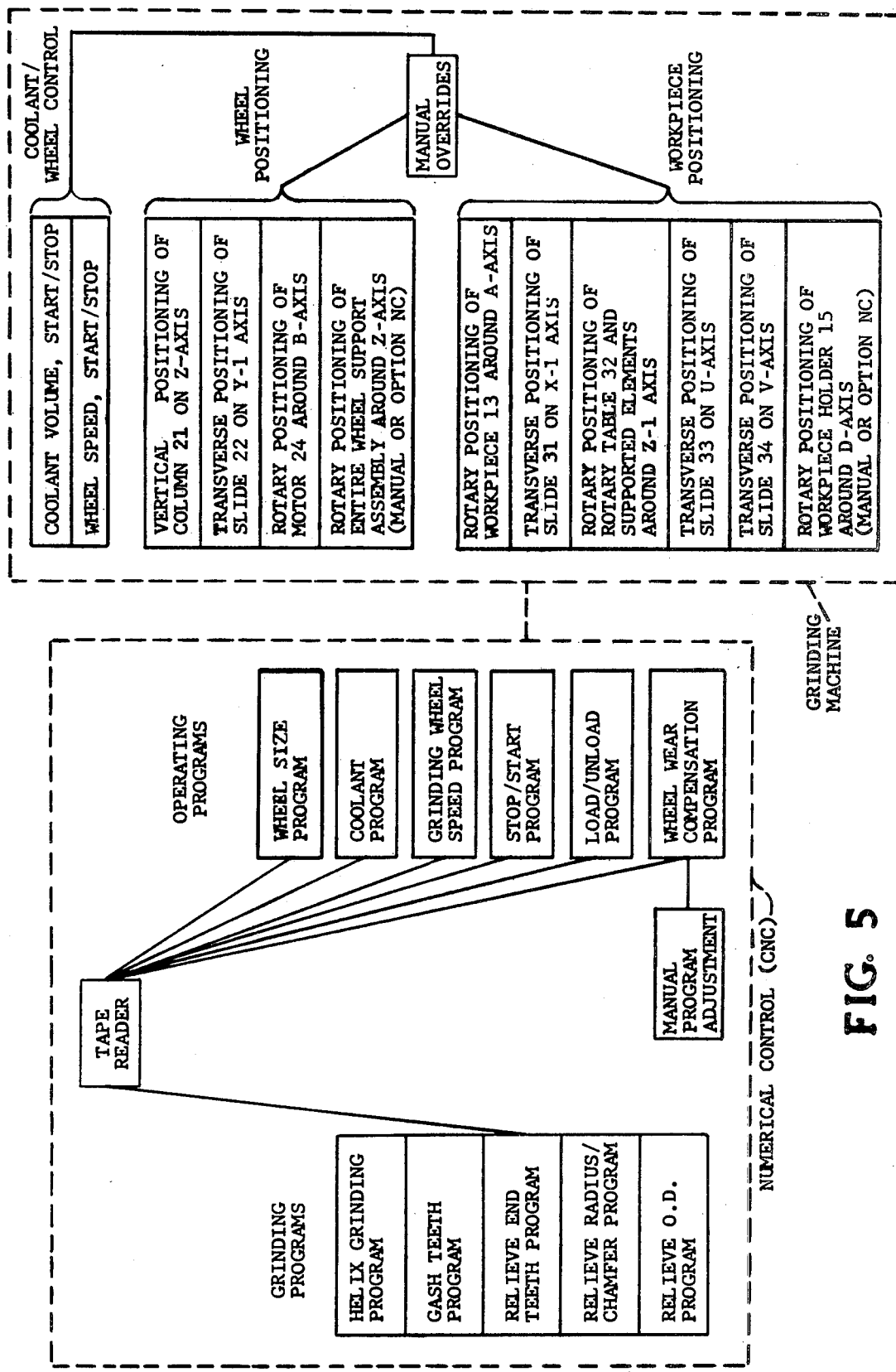
FIG. 5 is a block diagram showing the operator functions within the programmed numerical control and various programs.

A coolant program is made a part of the overall computerized numerical program control as indicated in FIG. 5. Thus, the program itself can be readily changed to vary the specific manner in which the coolant is supplied to optimize such coolant supply for a particular operation on a particular type of tool. The adaptability of the invention to use of a coolant in the manner described is, of course, highly desirable since it serves to reduce friction and wear on the grinding wheel and also provides a superior surface finish on the completed cutting tool. The invention is deemed particularly advantageous in not only eliminating the frequently used and inherently dry grinding process of the prior art but is providing a unique means for optimizing the manner in which the coolant is supplied in the grinding operation and without resort to operator skill.

As previously mentioned, the various automatic and numerically controlled motions of machine 10 are designed to enable the grinding wheel 12 and workpiece 13 to be brought into operative engagement with each other at virtually any desired angular relation necessary for the grinding of cutting tools. As shown in the block diagram of FIG. 5, the grinding operations involved in the grinding of a ball nose end mill includes: helix or flute grinding including the gash to center, primary and secondary relief angles on end teeth, (the radius), and the primary and secondary O.D. relief. What should be observed here is the fact that the grinding wheel edge will undergo a certain amount of wear in the course of completing the grinding operations on each end mill. Thus, it becomes necessary to compensate for this wear in order to maintain the desired degree of precision from one ground tool to the next. In the past, with manual adjustments, such wear wheel was compensated for through operator skill and experience. Thus, one operator's ability and experience might dictate one amount of compensation whereas another operator's ability and experience would dictate another amount of compensation which led to substantial nonuniformity as between tools ground by one operator as compared to tools ground by another operator. The previously-mentioned practice of providing means to automatically gauge the grinding wheel after completion of grinding of each tool and the operator adjusting by numerical control by manual input represented an advance over the purely manual wheel compensation method but nevertheless still required the complexity of the gauging and operator input. The present invention has sought to offer a dramatic improvement over the manual wheel wear compensation method and even a significant improvement over the known prior numerically controlled wheel wear compensation methods.

In connection with the present invention, it has been discovered that the amount of wheel wear can be predicted with sufficient accuracy to allow programming of fixed amounts of wheel wear compensation so that relative positioning of the grinding wheel and the tool being ground can be adjusted from tool-to-tool or even within one tool with sufficient accuracy to maintain a high degree of tolerance to compensate for grinding wheel wear. This discovery is based on discovering that if the grinding wheel itself is made according to a particular form and if the grinding wheel is repetitively used under precise numerically controlled and optimized conditions that the amount of wear can be made sufficiently uniform to allow sufficiently precise wheel wear compensation under program control to insure a relatively high degree of precision. The present invention, in its preferred form, is based upon using a grinding wheel which is so made that it can be used throughout all of the grinding operations required on the typical end mill and further is designed so that when the manner in which it is used is precisely numerically controlled the wear rate can be made substantially uniform and compensated for by programming alone without requiring any manual adjustment on the part of the operator and without requiring any of the relatively complex wheel gauging and feedback arrangements known to the prior art wheel wear compensation systems.

More particularly, it has been found that the amount of compensation required can be determined through experience and measurement with sufficient precision of the estimated wear on the wheel edge caused by the grinding of each tool to allow this information to be translated as control information in the numerical control program. After the grinding of each tool, the wheel wear compensation program thus automatically programs the appropriate servomotor mechanisms controlling the elements of wheel support system 20 and workpiece support system 30 to move each of the respective axes of the grinding wheel and the workpiece slightly closer together to compensate for wheel wear. Once so programmed, it will be appreciated that no feedback or wheel gauging is thereafter necessary. In the grinding of a typical ball nose end mill, as an example, and with the preferred grinding wheel utilized in the present invention, a wheel wear of approximately 0.001 inch is typical nominal value for the wear to be expected from the grinding of each tool on the edge that actually performs the grinding. The wheel wear compensation program does not necessarily require that such compensation be made after the grinding of every tool but when tolerances so allow may be made, for example, after a set of tools have been ground such as a set of five tools. As noted, each wheel wear compensation program will include a nominal value expected to be the average wear per cutting tool grind. If the actual wear varies from the estimated nominal value, the program may be readily modified. For example, it has been found that new grinding wheels may wear somewhat less than the estimated amount whereas worn wheels with a remaining useful life may wear somewhat more than the estimated amount. As noted in FIG. 5, a manual adjustment for the wheel wear compensation is provided for the purposes just described. Thus, if by actual observation or measurement of the workpiece, a particular wheel requires more or less compensation than has been programmed, such adjustment can be made within the control by the operator manually selecting a different set of values from stored memory. The control then adjusts the program output itself as required. Thus, as an example, if a tool being ground due to heat treating has been made of harder metal than the tool blank previously ground, there will be more wear on the grinding wheel due to the harder metal and the necessary wheel wear compensation correction can be made very rapidly in the manner described.

The type and shape of grinding wheel utilized for practicing the invention is deemed important, however, most any feasible shape could be used depending on the product to be ground, because of the multiple slides and the relative positions obtainable with them. One preferred grinding wheel 12 is shown in FIG. 6. It will be noted that griniding wheel 12 partakes generally of a known saucer shape in cross section and is provided with a diamond grinding face insert 50 which, in the form illustrated, is designed to wear back evenly during the life of the grinding wheel. In one embodiment, the coolant was sulphurized chloride oil, the wheel had a diamond edge and the tool had tungsten carbide surfaces. Vitrified grinding wheels and water soluble coolants can be used since the wheel wear compensation is so readily adjustable to any conditions. In one example, the illustrated grinding wheel was designed to wear to the point of reducing the diameter by one-half inch before it became necessary to discard the wheel. Note should be taken here that uniform wheel wear not only extends the useful life of the wheel but it reduces any adjustment to the operation of the wheel wear compensation program. Also, by controlling the manner of wheel construction and precisely controlling its positioning during use under numerical control, an important objective of the invention is achieved, namely that of being able to completely grind the tool at one station with the same grinding wheel being used for all of the grinding operations.

While previously mentioned, it should be recognized that while the present description is primarily concerned with ball nose end mill grinding with a single wheel, other applications may employ automatic compensation for wheel size as well as wheel wear. Also, as later described, wheels of different shape may be employed on the same or opposite ends of the spindle. Also, the invention allows for trueing or dressing the grinding wheel itself when so required.

Another feature of the program control illustrated in FIG. 5 is the grinding wheel speed program. In this regard, it is long been known that the grinding of particular edges or surfaces are better performed at one wheel grinding speed than another. Therefore, for the purpose of optimizing grinding wheel speed according to the grinding operation being performed, the grinding wheel drive motor 24 is provided as a variable speed motor and the grinding wheel speed program indicated in FIG. 5 is thus enabled to control the rotational speed of grinding wheel 12 such that for optimum grinding conditions, the grinding wheel 12 will rotate at the particular speeds which are appropriate to the particular grinding operations.

It will also be appreciated that when wheel support system 20 and workpiece support system 30 are being repositioned after completing one grinding operation and before commencing another grinding operation, it may be desirable to stop and restart the rotation of the grinding wheel 12. For this purpose, as indicated in FIG. 5, there is also provided what is designated as a "Stop/Start Program". It will, of course, be appreciated that not all transitions between grinding operations will require that the rotation of grinding wheel 12 come to a complete stop. In these circumstances, the Stop/Start Program would be ineffective.

To complete the description of FIG. 5, it will also be noted that a so-called "Load/Unload Program" is provided and this program is designed to bring the respective wheel support system 20 and workpiece support system 30 to their respective programmed starting positions each time a grinding operation is completed on a particular tool in order that such ground tool may be removed from the machine and a new tool loaded into the workpiece holder 15 in the manner previously described. Appropriate manual override controls may be provided for emergencies, unexpected circumstances, and the like, as generally depicted in FIG. 5 and which may be arranged according to well-known practices in the art.

As illustrated in FIG. 4, grinding machine 10 is adapted for rotative positioning about reference axis D and also for rotative positioning about reference axis Z. Mention has also been made that rotation about the respective reference axes D and Z may be obtained manually and fixed manually or, in the optional arrangement indicated, may be positioned and fixed manually by numerical control as indicated. In either event, prior to commencing the grinding operation, it is contemplated that the workpiece holder 15 will be rotated about reference axis D through an angle of plus or minus twenty degrees from the horizontal and will then be locked into such position by means of an appropriate locking means. Also, it is contemplated that the rotational positioning about axis Z will allow a movement of plus or minus forty-five degrees from a central position and this rotational position will also be made and fixed before the grinding operation commences. The reason that reference axis D and reference axis Z are rotatively positioned and fixed is that it has been found that all of the necessary grinding operations on the typical end mill, and particularly the ball nose type end mill being used as an example, can be completed by initially locking workpiece holder 15 in a fixed rotative position around axis D and by locking column 21 and all of the supported structure thereon in a fixed rotative position about axis Z since further controlled rotative movement of reference axis D and further controlled rotative movement of column 21 about axis Z will not thereafter be required. Optionally, N/C drives 29 and 38 are used.

In a preferred mode of operating machine 10, the workpiece 13 is placed in the workpiece holder 15 and the Load/Unload Program brings the respective wheel support system and workpiece support system 30 to their respective starting positions as will have been previously calibrated and determined. Using the grinding of a ball nose end mill as an example in the preferred program operation, prior to commencing of any grinding, a selected arbitrary point on the tip end of the workpiece 13 will be initially positioned in a definite relationship with the starting positions of all of the reference axes of the machine. Here note might be taken that the grinding operation now scheduled to commence will basically consist of generating the required edges and clearance surfaces on the tool 13 in the manner required. What should also be understood is that each of the edge and surface grinding programs indicated in FIG. 5 represent precise programs for mathematically locating all of the edges and clearance surfaces to be ground during the overall grinding operation.

With the above in view, the first grinding operation involves the establishment of a geometric mathematically-defined helical cutting surface which is accomplished by grinding a helical shape into the tool according to the mathematically-generated helix grinding program stored in the computer control. After completion of the helix which will also have resulted in grinding the correct rake in the flutes, the respective wheel support system 20 and workpiece support system 30 will be repositioned to grind the necessary relief angle. The gash, primary and secondary relief angles on the end teeth will be ground sequentially followed by grinding of the radius and chamfer on the corners and, finally, grinding of the primary and secondary O.D. relief. Throughout these various operations, it will, of course, be understood that the coolant program will be numerically controlled to come on and off as required and to vary the quantity of coolant as previously explained. Also, the grinding wheel speed program will numerically control the speed of the grinding wheel 12 as required and the rotation of grinding wheel 12 will be stopped and started during the grinding operation by the Stop/Start Program as previously explained. At the end of the complete grinding operation, the tool will have been completely ground and will be ready for its intended application. Also to be noted is that the grinding operation can be programmed for special geometric shapes, e.g. radius ball nose cutters, tapered cutters, hollow, flat and radial reliefs, and the like, such that the finish tool will include any desired special geometric shape in addition to the ordinary tool shape or any of the reliefs shown in FIG. 12.

While the description thus far has dealt principally with application of the invention to grinding of a ball nose end mill, other applications, features, and uses of the invention should be recognized. For example, the unique arrangement of the various reference axis, the availability of the relatively large number of N/C simultaneous movements and the ability of the grinding wheel to spin on axis B gives wide latitude in application of the invention. For example, it can be seen as previously mentioned that machine parts such as hydraulic valve spools, cams, crush form dressing rolls, and the like, can be ground quickly and with a high degree of precision according to programs fitting the respective parts. The grinding wheel itself can be trued or dressed by mounting the wheel as the "workpiece" and grinding the same with an appropriate dressing wheel. In this operation, two N/C rotary and two N/C linear axes could be used simultaneously to facilitate the operation. As illustrated in FIG. 14, by way of example, the invention facilitates use of multiple wheels and there is shown a rough grind wheel 60 and a finish grind wheel 61 on one end of the spindle 70 and a wheel of larger diameter 62 on the opposite end of the spindle and which would be available for any other grind suited to the job in hand. As further illustrated in FIG. 15, a wheel 65 of one shape could be mounted on one end of the spindle 70 and a wheel 66 of different shape could be mounted on an opposite end of spindle 70 and either could be oriented as required under numerical controls as previously described. Engraving operations are also entirely feasible.

In summary, the grinding machine and method of the present invention afford a number of advantages over the prior art. In particular, the cutting tools may be ground with no heat cracks, better surface finishes, more accurate indexing of the cutting edges, more accurate run out, and with precisely repeatable geometry. A choice of reliefs including hollow ground, flat ground and radial is afforded. Resharpening of worn cutters is facilitated because the tool can be relocated in the machine in the precise location required to repeat the mathematically located and defined geometry of the tool as originally ground. Since all of the grinding is done while the shank of the workpiece is clamped in one workpiece holder and is ground throughout with the same grinding wheel, tolerances of better than 0.001 inch can be achieved as compared to present tolerances in the range of 0.004 inch with respect to such dimensions as run out, tooth-to-tooth spacing and O.D. The absence of heat cracks and the improved surface finish are particularly important and are attributable to the fact that the cutters are ground with the machine and method of the invention while using a coolant whose flow is under numerical control, while performing all grinding operations with optimized grinding wheel speeds and while positioning both the grinding wheel and tool being ground according to predetermined, precise mathematical formulas which precisely define and locate the various edges and surfaces ground on the tool. The dry, finger method of FIG. 13 is avoided.

Another advantage which will be appreciated by those skilled in the art from the foregoing description is the fact that the machine and method of the invention leads to a substantial reduction in the setup time required for each operation. The usual setup requires skilled workmanship, is time consuming and must be done for each operation. In the grinding of a ball nose end mill, for example, where three separate setups are required, typical setup times would be one to one and one-half hours for the gasher, one to one and one-half hours for the reliever and one-half to one hour for the radius O.D. In contrast, the tool to be ground with the present method and machine of the invention can be set in its adapter and properly adjusted in about two minutes. On the infrequent occasions when a new grinding wheel must be replaced, about ten minutes is required. Alternately, instead of a new control tape corresponding to a new tool, this could have been stored in memory and thus recalled from memory and no new tape would be needed to bring to a operable control condition. Therefore, the total setup time will vary from three to thirteen minutes as compared to two and one-half to four hours. While the machine and method of the invention are primarily directed to grinding tools requiring an extremely high degree of precision, it is recognized that certain tools of relatively low precision, e.g. wood cutting tools, may also be ground according to the invention but without necessarily requiring use of N/C coolant, any coolant or the same degree of precision as previously described. Irrespective of the material being ground, e.g., aluminum, steel, plastic, or the part being ground, e.g., soft bar stock or a hard end mill surface, or the wheel being used for the grinding, it can be seen that the grinding operation conditions can be optimized and programmed to achieve degrees of precisions never heretofore achieved. Such programming, as previously stated, could be by the described N/C or by an equivalent, programmable control and incremental drive and "N/C" is used in this sense.

What is claimed is:

1. The method of machine grinding a workpiece such as a cutting tool with a grinding wheel comprising the steps:
   (a) installing the workpiece in the workpiece holder of the machine and positioning the central axis of the workpiece with respect to fixed reference X, Y, Z axes appropriate to the first grinding operation to be performed thereon and fixing the workpiece in such position;
   (b) incrementally and independently and by N/C, positioning the workpiece during grinding thereof relative to the following axis:
      (i) rotatively, with respect to an axis extending through the workpiece as a first axis;
      (ii) linearly, with respect to a second horizontal linear axis at all times disposed below said workpiece axis and fixed perpendicular thereto;
      (iii) linearly, with respect to a third horizontal linear axis at all times disposed below said second axis and fixed relative thereto;
      (iv) rotatably, with respect to a fourth vertical axis intersecting said third axis and perpendicular to said second axis; and
      (v) linearly, with respect to a fifth horizontal axis intersected by and perpendicular to said fourth vertical axis;
   (c) installing the wheel on the spindle of a motor drive supported by the wheel support structure and positioning said wheel support structure around a sixth fixed vertical axis to a rotated wheel support structure position appropriate to the grinding to be performed and fixing said wheel support structure in such position with respect to rotation about said sixth axis; and
   (d) incrementally and independently and by N/C positioning the wheel during grinding of said workpiece relative to the following axes passing through said wheel support structure:
      (i) linearly, in a vertical direction with respect to said sixth vertical axis;
      (ii) linearly, in a horizontal traverse, with respect to a seventh horizontal axis intersecting and perpendicular to said sixth axis; and
      (iii) rotatively, in a vertical sweep, with respect to an eighth horizontal axis parallel to said seventh axis; and
   (e) synchronizing said N/C workpiece and wheel positioning by N/C programs whereby said N/C positioning with respect to any number of said axes may take place simultaneously as and when required during the grinding of said workpiece.

2. The method of claim 1 including the step of flowing a coolant onto said workpiece during grinding thereof and programming the timing and volume of said coolant by N/C according to the grinds being executed on said workpiece.

3. The method of claim 1 including the step of adjusting the position of said workpiece and wheel by N/C at selected times corresponding to a selected number of workpieces such as tools being ground to compensate for wheel wear and according to a predicted amount of wear per workpiece.

4. The method of claim 1 including the step of flowing a coolant onto said workpiece during grinding thereof and programming the timing and volume of said coolant by N/C according to the grinds being executed on said workpiece and including the step of adjusting the position of said workpiece and wheel by N/C at selected times corresponding to a selected number of workpieces such as tools being ground to compensate for wheel wear and according to a predicted amount of wear per workpiece.

5. The method of claim 1 wherein said workpiece comprises a cutting tool and said wheel is formed in a manner adapted to complete the grinding of said tool ready for its intended application by following said steps in an interrupted continuous sequence while said tool remains in the same said holder and all said grinding is performed solely with said wheel.

6. The method of claim 1 wherein said workpiece comprises a worn grinding wheel to be dressed and said first mentioned wheel is adapted to complete the dressing of said worn grinding wheel and said programmed machine control is designed to affect the dressing of such worn grinding wheel and later accept the same as said first mentioned wheel and compensated for such dressing.

7. The method of machine grinding a workpiece such as a cutting tool with a grinding wheel under program control comprising the steps:
   (a) installing the workpiece in the workpiece holder of the machine and positioning the central axis of the workpiece with respect to fixed reference X, Y, Z axes appropriate to the first grinding operation to be performed thereon and fixing the workpiece in such position;
   (b) incrementally and independently and by program controlled incremental operator means positioning the workpiece during grinding thereof relative to the following axis:
      (i) rotatively, with respect to an axis extending through the workpiece as a first axis;
      (ii) linearly, with respect to a second horizontal linear axis at all times disposed below said workpiece axis and fixed perpendicular thereto;
      (iii) linearly, with respect to a third horizontal linear axis at all times disposed below said second axis and fixed relative thereto;
      (iv) rotatably, with respect to a fourth vertical axis intersecting said third axis and perpendicular to said second axis; and
      (v) linearly, with respect to a fifth horizontal axis intersected by and perpendicular to said fourth vertical axis;
   (c) installing the wheel on the spindle of a motor drive supported by the wheel support structure and positioning said wheel support structure around a sixth fixed vertical axis to a rotated wheel support structure position appropriate to the grinding to be performed and fixing said wheel support structure in such position with respect to rotation about said sixth axis; and (d) incrementally and independently and by program controlled incremental operator means positioning the wheel during grinding of said workpiece relative to the following axes passing through said wheel support structure:

(i) linearly, in a vertical direction with respect to said sixth vertical axis;

(ii) linearly, in a horizontal traverse, with respect to a seventh horizontal axis intersecting and perpendicular to said sixth axis; and (iii) rotatively, in a vertical sweep, with respect to an eighth horizontal axis parallel to said seventh axis; and (e) synchronizing said workpiece and wheel positioning by programmed machine control adapted to control said incremental operator means whereby said incremental operator positioning with respect to any number of said axes may take place simultaneously as and when required during the grinding of said workpiece.

* * * * *

UNITED STATES PATENT AND TRADEMARK OFFICE
CERTIFICATE OF CORRECTION

PATENT NO. : 4,186,529
DATED : February 5, 1980
INVENTOR(S) : Stanley E. Huffman It is certified that error appears in the above—identified patent and that said Letters Patent is hereby corrected as shown below:

Col. 4, line 30, "machine" should be --method--.

Col. 5, line 22, "provide" should be --provides--.

Col. 11, line 60, insert --axis-- after "vertical".

Col. 13, line 52, "is" should be --in--.

Col. 15, line 37, "griniding" should be --grinding--.

Col. 16, line 3, "is" should be --has--.

Col. 20, line 29, "interrupted" should be --uninterrupted--.

Col. 20, line 36, "affect" should be --effect--.

Col. 20, line 38, "compensated" should be --compensation--.

Signed and Sealed this

Ninth Day of December 1981

[SEAL]

Attest:

SIDNEY A. DIAMOND

Attesting Officer

Commissioner of Patents and Trademar